US007165839B2

(12) United States Patent
Winterton et al.

(10) Patent No.: US 7,165,839 B2
(45) Date of Patent: Jan. 23, 2007

(54) METHOD FOR PRODUCING TINTED CONTACT LENSES

(75) Inventors: Lynn Cook Winterton, Alpharetta, GA (US); John Martin Lally, Lilburn, GA (US); Juergen Vogt, Duluth, GA (US)

(73) Assignee: Novartis AG, Basel (CH)

( * ) Notice: Subject to any disclaimer, the term of this patent is extended or adjusted under 35 U.S.C. 154(b) by 140 days.

(21) Appl. No.: 11/007,442

(22) Filed: Dec. 8, 2004

(65) Prior Publication Data

US 2005/0134795 A1 Jun. 23, 2005

Related U.S. Application Data

(60) Provisional application No. 60/530,959, filed on Dec. 19, 2003.

(51) Int. Cl.
*G02C 7/04* (2006.01)
(52) U.S. Cl. ...................................... 351/177; 351/162
(58) Field of Classification Search ................ 351/162, 351/177
See application file for complete search history.

(56) References Cited

U.S. PATENT DOCUMENTS

| | | | | |
|---|---|---|---|---|
| 3,992,343 A | 11/1976 | Haschke et al. | ............ | 260/29.6 |
| 4,666,640 A | 5/1987 | Neefe | ........................ | 264/2.1 |
| 4,746,691 A * | 5/1988 | Fuhrman | ..................... | 524/40 |
| 5,030,669 A | 7/1991 | Hendrickson et al. | ...... | 523/333 |
| 5,076,846 A | 12/1991 | Buri et al. | .................. | 106/401 |
| 5,663,224 A | 9/1997 | Emmons et al. | ............ | 524/188 |
| 6,048,550 A | 4/2000 | Chan et al. | .................. | 424/497 |
| 6,080,802 A * | 6/2000 | Emmons et al. | ............ | 523/205 |
| 6,149,842 A | 11/2000 | Lally et al. | ................. | 264/1.36 |
| 6,203,909 B1 | 3/2001 | Chassot | ....................... | 428/403 |
| 6,251,366 B1 | 6/2001 | Kormann et al. | ......... | 424/9.322 |
| 6,262,207 B1 | 7/2001 | Rao et al. | .................... | 526/224 |
| 6,395,804 B1 | 5/2002 | Rao et al. | .................... | 523/160 |
| 6,467,904 B1 | 10/2002 | Gartley et al. | .............. | 351/177 |
| 6,576,051 B1 | 6/2003 | Bardman et al. | ........... | 106/436 |
| 6,596,445 B1 * | 7/2003 | Matsumoto et al. | ........... | 430/7 |
| 6,852,254 B1 * | 2/2005 | Spaulding et al. | ......... | 264/1.36 |
| 2002/0056403 A1 | 5/2002 | Johnson et al. | ............. | 106/493 |

OTHER PUBLICATIONS

PCT International Search Report.
Communicationi Relating to the Results of the Partial International Search.

* cited by examiner

*Primary Examiner*—Scott J. Sugarman
(74) *Attorney, Agent, or Firm*—Jian Zhou

(57) ABSTRACT

The invention provides a method of producing a full-body tinted contact lens. The method of the invention comprises the steps of: preconditioning particles of a pigments; dispersing the preconditioned pigment particles in a polymerizable fluid composition to obtain a pigment-containing polymerizable dispersion; introducing an amount of the pigment-containing polymerizable dispersion in a mold for making a contact lens; polymerizing the polymerizable dispersion in the mold to form a full-body tinted contact lens with the particles of the pigment entrapped and distributed therein. In addition, the invention provides a method for preparing preconditioned pigment particles and full-body tinted contact lenses produced according the method of the invention.

20 Claims, No Drawings

METHOD FOR PRODUCING TINTED CONTACT LENSES

This application claims the benefit under 35 USC § 119(e) of U.S. provisional application No. 60/530,959 filed Dec. 19, 2003, incorporated by reference in its entirety.

The present invention is related to a method and composition for producing tinted contact lenses.

BACKGROUND OF THE INVENTION

Visible light absorbing colorants (e.g., dyes, in particular pigments) have been incorporated into contact lenses to enable the consumer to easily locate the lens in a clear solution within a lens storage, disinfecting or cleaning container. Dyeing a lens for this purpose is termed "visibility tinting" the lens.

Visibility tinting may be accomplished by applying a colorant to a portion of the surface, or by applying a colorant to the full front surface of the lens. Alternatively, a colorant may be incorporated into the full body of the polymer matrix of the lens. There have been a number of patents and published patent applications relating to tinting contact lenses. However, the known processes are not yet totally satisfactory. For instance, a pigment dispersion, especially a lens-forming formulation with pigments having submicron particle size may not be stable over an extended long period of time, for example, at least four days or longer. Consequently, the production efficiency and/or the quality of the products obtained can be adversely affected by such problem.

Therefore, there is still a need for a method of making a visibility tinted, i.e., full-body tinted, contact lens with an improved efficiency by, for example, providing a lens-forming formulation including pigment particles with an increased stability.

SUMMARY OF THE INVENTION

An object of the invention is to provide a method for increasing the stability of a lens-forming formulation containing pigment particles.

Another object of the invention is to provide a process for producing full-body visibility tinted contact lenses.

These and other objects and advantages are achieved by the present invention, a summary of which follows.

The invention, in one aspect, provides a method of producing a full-body tinted contact lens. The method of the invention comprises the steps of: preconditioning particles of a pigments; dispersing the preconditioned pigment particles in a polymerizable fluid composition to obtain a pigment-containing polymerizable dispersion; introducing an amount of the pigment-containing polymerizable dispersion in a mold for making a contact lens; polymerizing the polymerizable dispersion in the mold to form a full-body tinted contact lens with the particles of the pigment entrapped and distributed therein.

In another aspect, the present invention provides a method of preparing preconditioned pigment particles. The method of the invention comprises: grinding, milling, or otherwise pulverizing a pigment in a solution of a polyionic material to a particle size of 1.5 micrometers or smaller to obtain a dispersion, wherein the concentration of the polyionic material is sufficient to coat pigment particles, preferably from about 0.01% to 10% (wt/vol); filtering the solution with pigment particles; optionally washing the filtered pigment particles; and optionally drying the filtered pigment particles coated with the one or more polyionic materials.

In a further aspect, the invention provides a visibility tinted ophthalmic lens comprising a polymeric matrix and preconditioned particles of a pigment distributed therein, wherein the polymeric matrix is a polymerization product of a polymerizable dispersion including a polymerizable material and the preconditioned particles of the pigment. A preferred ophthalmic lens is a visibility tinted contact lens formed from a polymerizable dispersion having preconditioned particles of copper phthalocyanine and at least one polymerizable prepolymer or macromer.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is understood by one of ordinary skill in the art that the present discussion is a description of exemplary embodiments only, and is not intended as limiting the broader aspects of the present invention. It is also understood that, as used in the specification including the appended claims, the singular forms "a," "an," and "the" include plural references unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings.

The term "contact lens" employed herein in a broad sense and is intended to encompass any hard or soft lens used on the eye or ocular vicinity for vision correction, diagnosis, sample collection, drug delivery, wound healing, cosmetic appearance (e.g., eye color modification), or other ophthalmic applications. In accordance with the present invention, a contact lens is preferably a soft contact lens made of a hydrogel material.

A "hydrogel material" refers to a polymeric material which can absorb at least 10 percent by weight of water when it is fully hydrated. Generally, a hydrogel material is obtained by polymerization or copolymerization of at least one hydrophilic monomer or prepolymer in the presence of or in the absence of additional monomers and/or macromers. Exemplary hydrogels include, but are not limited to, poly(vinyl alcohol) (PVA), modified polyvinylalcohol (e.g., as nelfilcon A), poly(hydroxyethyl methacrylate), poly(vinyl pyrrolidone), PVAs with polycarboxylic acids (e.g., carbopol), polyethylene glycol, polyacrylamide, polymethacrylamide, silicone-containing hydrogels, polyurethane, polyurea, and the like. A hydrogel can be prepared according to any methods known to a person skilled in the art.

As used herein, a "polymerizable fluid composition" refers to a solution or a solvent-free liquid or melt at a temperature below 60° C. of a polymerizable material. A polymerizable fluid composition can also include other components, such as a photoinitiator, a visibility tinting agent, UV-blocking agent, photosensitizers, antimicrobial agents, and the like.

The term "fluid" as used herein indicates that a material is capable of flowing like a liquid.

A "polymerizable material" refers to a material which can be polymerized and/or crosslinked thermally or actinically (i.e., by actinic radiation) to obtain crosslinked and/or polymerized material.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), and microwave irradiation.

Exemplary ethylenically unsaturated groups include without limitation acryloyl, methacryloyl, allyl, vinyl, styrenyl, or other C=C containing groups.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "polymer" means a material formed by polymerizing/crosslinking one or more monomers.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. Preferably, a prepolymer contains ethylenically unsaturated groups and can be polymerized actinically or thermally.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "photoinitiator" refers to a chemical that initiates radical crosslinking or polymerizing reaction by the use of light.

A "thermal initiator" refers to a chemical that initiates radical crosslinking or polymerizing reaction by the use of heat energy.

A "visibility tinting agent" refers to a colorant (substance) that dyes (or colors) a contact lens to enable a user to easily locate a contact lens in a clear solution within a lens storage, disinfecting or cleaning container. It is well known in the art that a dye and/or a pigment can be used as a visibility tinting agent.

A "dye" means a substance that is soluble in a solvent and that is used to impart color. Dyes are typically translucent and absorb but do not scatter light. Any suitable biocompatible dye can be used in the present invention.

A "pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions. Examples of preferred pigments include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

An "antimicrobial agent", as used herein, refers to a chemical that is capable of decreasing or eliminating or inhibiting the growth of microorganisms such as that term is known in the art.

A "charged polymeric material" or a "polyionic material" refers to a charged polymer that has a plurality of charged groups in a solution, or a mixture of charged polymers each of which has a plurality of charged groups in a solution. Exemplary charged polymers includes polyelectrolytes, p- and n-type doped conducting polymers. Charged polymeric materials include both polycationic (having positive charges) and polyanionic (having negative charges) polymeric materials.

A polycationic material used in the present invention can generally include any material known in the art to have a plurality of positively charged groups along a polymer chain. For instance, suitable examples of such polycationic materials can include, but are not limited to, poly(allylamine hydrochloride) (PAH), poly(ethyleneimine) (PEI), poly(vinylbenzyltriamethylamine) (PVBT), polyaniline (PAN or PAN I) (p-type doped) [or sulphonated polyaniline], polypyrrole (PPY) (p-typed doped), and poly(pyridinium acetylene).

A polycationic material used in the present invention can also include polymeric quaternary ammonium compounds (polyquats). When polyquats are used in the coating of an ophthalmic lens, they may impart antimicrobial properties to the ophthalmic lens.

A polyanionic material used in the present invention can generally include any material known in the art to have a plurality of negatively charged groups along a polymer chain. For example, suitable polyanionic materials can include, but are not limited to, polymethacrylic acid (PMA), polyacrylic acid (PAA), poly(thiophene-3-acetic acid) (PTAA), poly(4-styrenesulfonic acid) (PSS), sodium poly (styrene sulfonate) (SPS) and poly(sodium styrene sulfonate) (PSSS).

The foregoing lists are intended to be exemplary, but clearly are not exhaustive. A person skilled in the art, given the disclosure and teaching herein, would be able to select a number of other useful polyionic materials including a synthetic polymer, a biopolymer or a modified biopolymer.

The invention, in one aspect, provides a method of producing a full-body tinted contact lens. The method of the invention comprises the steps of: preconditioning particles of a pigments; dispersing the preconditioned pigment particles in a polymerizable fluid composition to obtain a pigment-containing polymerizable dispersion; introducing an amount of the pigment-containing polymerizable dispersion in a mold for making a contact lens; polymerizing the polymerizable dispersion in the mold to form the a full-body tinted contact lens with the particles of the pigment entrapped and distributed therein.

As used herein, "preconditioning of particles of a pigment" refers to a process which comprises the steps of: applying a coating of one or more polyionic materials onto the surfaces of pigments particles by contacting the pigment particles with a solution of the one or more polyionic materials; filtering the solution with pigment particles, optionally washing the filtered pigment particles; and optionally drying the filtered pigment particles coated with the one or more polyionic materials. It has been discovered that by preconditioning particles of a pigments, those preconditioned pigment particles can be easily dispersed in water and most importantly in a lens formulation for making contact lenses to obtain a pigment-containing polymerizable dispersion for making full-body tinted contact lenses. The obtained pigment-containing polymerizable dispersion has been found to be very stable, without any significant agglomeration over five months. It is believed that by preconditioning, particles of a pigment can be coated with one ore more polyionic material. The coating of one ore more polyionic material may play a central role to facilitate re-dispersion of pigment particles and stabilize the obtained pigment-containing polymerizable dispersion.

A method of the present invention provides some advantages over the existing methods.

First, the a polymerizable dispersion can be easily prepared from any lens formulation simply by re-dispersing preconditioned pigment particles in the lens formulation. Exemplary lens formulations include without limitation the formulation of nelfilcon, lotrafilcon A, lotrafilcon B, etafilcon A, genfilcon A, lenefilcon A, polymacon, acquafilcon A, balafilcon, and the like.

Second, with preconditioned pigments particles, one can prepare a pigment-containing polymerizable dispersion having any desired concentration of pigment particles.

Third, because of its high stability, a pigment-containing polymerizable dispersion be prepared in well advance before production of contact lenses. Therefore, one can have flexibility in production scheduling of lens productions.

Fourth, because of its high stability, pigment particles can be uniformly distributed in a contact lens so as to obtain a full-body tinted contact lens.

The amount of pigment necessary in a particular application may vary within wide limits dependent, in part, upon the desired final product dimensions and desired visible and/or ultraviolet light transmission. For example, an amount of pigment is chosen so that the optical transmission of the final lens is, for example, greater than 80%, preferably greater than 90%, more preferably from about 92% to about 99.5%, and most preferably from about 93% to about 97%. The above transmission values refer to a 100 µm center thickness of the lens and to the wavelength of the absorption maximum of the respective pigment. The amount of pigment necessary to achieve the optical transmission is advantageously chosen so that the weight percentage of pigment, based on the total weight of the polymerizable material in the prepolymerizable fluid composition, is from about 0.0001% to about 0.05%. Preferably, the weight percentage of pigment is from about 0.0001% to about 0.02%. More preferably, the weight percentage of pigment is from about 0.0001% to about 0.01%.

The particle size of the pigment may vary within wide limits. In general, the particle size should be small enough to avoid light scattering, which is clinically significant for the degree of tint intensity required. An average or median particle size (as measured by HORIBA LA-910 particle size analyzer) of less than or equal to about 4 µm, preferably less than or equal to about 0.6 µm, more preferably from about 0.05 µm to about 1 µm, and even more preferably from about 0.05 µm to about 0.5 µm has proven advantageous.

The particle size of a pigment can be reduced by any standard grinding techniques. Preferred grinding techniques include: high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other techniques known to those skilled in the art (see Ross S and Morrison ID, *Colloidal Systems and Interfaces*. New York: John Wiley & Sons, 1988.)

In accordance with the present invention, a polymerizable fluid composition can be a solution or a solvent-free liquid or melt at a temperature below 60° C. of a polymerizable material in the presence or absence of other components, such as a photoinitiator, a visibility tinting agent, UV-blocking agent, photosensitizers, antimicrobial agents, and the like.

Where a polymerizable fluid composition is a solution, it can be prepared by dissolving a polymerizable material and all other desired components in any suitable solvent known to a person skilled in the art. Examples of suitable solvents are water, alcohols, such as lower alkanols, for example ethanol or methanol, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

In accordance with the present invention, a polymerizable material can be any materials known to a skilled artisan for making contact lenses. For example, a polymerizable material can be a prepolymer with ethylenically unsaturated groups, a mixture of prepolymers with ethylenically unsaturated groups, a mixture of vinylic monomers, a mixture of one or more macromers optionally with one or more vinylic monomers, or a mixture of one or more prepolymers with ethylenically unsaturated groups and one or more vinylic monomers and/or macromers with ethylenically unsaturated groups.

A preferred group of polymerizable materials are biocompatible, preferably ophthalmically compatible prepolymers which are water-soluble and/or meltable. It would be advantageous that a polymerizable material comprises primarily one or more prepolymers which are preferably in a substantially pure form (e.g., purified by ultrafiltration). Therefore, after crosslinking by actinic radiation, a contact lens may require practically no more subsequent purification, such as in particular complicated extraction of unpolymerized constituents. Furthermore, crosslinking may take place solvent-free or in aqueous solution, so that a subsequent solvent exchange or the hydration step is not necessary. For example, crosslinking or polymerizing may be undertaken from an aqueous solution containing about 15 to 90% of one or more prepolymers.

Examples of preferred prepolymers include, but are not limited to, a water-soluble crosslinkable poly(vinyl alcohol) prepolymer described in U.S. Pat. Nos. 5,583,163 and 6,303,687 (incorporated by reference in their entireties); a water-soluble vinyl group-terminated polyurethane which is obtained by reacting an isocyanate-capped polyurethane with an ethylenically unsaturated amine (primary or secondary amine) or an ethylenically unsaturated monohydroxy compound, wherein the isocyanate-capped polyurethane can be a copolymerization product of at least one polyalkylene glycol, a compound containing at least 2 hydroxyl groups, and at least one compound with two or more isocyanate groups; derivatives of a polyvinyl alcohol, polyethyleneimine or polyvinylamine, which are disclosed in U.S. Pat. No. 5,849,841 (incorporated by reference in its entirety); a water-soluble crosslinkable polyurea prepolymer described in U.S. Pat. No. 6,479,587 (herein incorporated by reference in its entirety); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in PCT patent application WO 2000/31150.

Another preferred group of polymerizable materials is the mixtures of at least one siloxane-containing vinylic monomer or macromer and other vinylic monomers. Any known suitable siloxane-containing vinylic monomers can be used in the present invention. Exemplary siloxane-containing monomers include, without limitation, methacryloxyalkylsiloxanes, tristrimethylsilyloxysilylpropyl methacrylate (TRIS), 3-methacryloxy propylpentamethyldisiloxane and bis(methacryloxypropyl)tetramethyl-disiloxane. A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any known suitable siloxane-containing micromers can be used in the present invention. Preferably, a siloxane-containing macromer selected from the group consisting of Macromer A, Macromer B, Macromer C, and Macromer D, which are described in U.S. Pat. No. 5,760,100, herein incorporated by reference in its entirety.

In accordance with the present invention, a polymerizable material can also comprise a hydrophilic monomer. Nearly any hydrophilic monomer that can act as a plasticizer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl) acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)—(where the term "amino" also includes quaternary ammonium), mono (lower alkylamino)(lower alkyl) and di(lower alkylamino) (lower alkyl)acrylates and methacrylates, allyl alcohol and the like.

Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethyl-methacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable material can also comprises a hydrophobic monomer. By incorporating a certain amount of hydrophobic monomer in a polymerizable fluid composition, the mechanical properties (e.g., modulus of elasticity) of the resultant polymer may be improved. Examples of suitable hydrophobic vinylic comonomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis(methacryloxypropyl)-tetramethyl-disiloxane. TRIS, which may act both to increase oxygen permeability and to improve the modulus of elasticity, is a particularly preferred hydrophobic monomer.

It is preferable to use a hydrophobic vinylic monomer, or a mixture of a hydrophobic vinylic monomer with a hydrophilic vinylic monomer, whereby this mixture contains at least 50 percent by weight of a hydrophobic vinyl comonomer. In this way, the mechanical properties of the resultant polymer may be improved without the water content dropping substantially. Both conventional hydrophobic vinylic monomers and conventional hydrophilic vinylic monomers are suitable for copolymerization with the prepolymers or silicone-containing macromers.

In accordance with the present invention, a polymerizable fluid composition can further comprise various components, such as cross-linking agents, initiator, UV-absorbers, inhibitors, fillers, visibility tinting agents, and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is in the range from 0.05 to 20%, in particular in the range from 0.1 to 10%, and preferably in the range from 0.1 to 2%.

Initiators, for example, selected from materials well known for such use in the polymerization art, may be included in the polymerizable fluid composition in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylo-phosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Examples of suitable thermal initiators include, but are not limited to, 2,2'-azobis (2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronite (AIBN).

The polymerizable fluid composition can be introduced into a mold by methods known per se, especially conventional dispensing, e.g. dropwise addition in a desired quantity.

Appropriate disposable molds are made, for example, from polypropylene. Suitable materials for re-usable mounds are e.g. quartz, sapphire glass or metals.

If the molded articles to be produced are contact lenses, these may be produced in a manner known per se, e.g. in a conventional "spin-casting mold", as described for example in U.S. Pat. No. 3,408,429, or by the so-called full mold process in a static form, as described e.g. in U.S. Pat. Nos. 4,347,198, 5,508,317, 5,583,463, 5,789,464, and 5,849,810.

Crosslinking/polymerizing of the composition may be initiated in the mold actinically (e.g. by means of actinic radiation, such as UV irradiation, gamma or X-ray irradiation) or thermally.

Opening of the mold so that the molded article can be removed from the mold may take place in a manner known per se.

If the molded article produced according to the invention is a contact lens which is produced solvent-free from an already purified crosslinkable prepolymer in the absence of vinylic monomers according to the invention, then after removal of the molded article, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens (in particular, a hydrogel contact lens) is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

The aqueous salt solutions used for hydration are advantageously solutions of physiologically compatible salts, such as buffer salts conventionally used in the field of contact lens care, e.g. phosphate salts, or isotonizing agents conventionally used in the field of contact lens care, such as in particular alkali halides, e.g. sodium chloride, or solutions of mixtures thereof. One example of an especially suitable salt solution is an artificial, preferably buffered lachrymal fluid, which is adapted to natural lachrymal fluid as regards pH value and osmolarity, e.g. an unbuffered or preferably buffered common salt solution, for example buffered by phosphate buffer, whose osmolarity and pH value correspond to the osmolarity and pH value of human lachrymal fluid.

The aqueous salt solutions used for hydration preferably contain biocompatible organic multi-acids or biocompatible salts thereof in an amount sufficient to improve the stability of the poly(oxyalkylene)-containing polymer made from the composition.

The above-defined hydration fluids are preferably at least substantially free from undesired constituents. This is most preferably pure water or an artificial lachrymal fluid as described above.

If the molded article produced according to the invention is a contact lens which is produced from an aqueous solution of an already purified crosslinkable prepolymer in the absence of vinylic monomers according to the invention, then the crosslinked product is likely not to contain any impurities. It is therefore not necessary to carry out subsequent extraction. Since crosslinking is carried out in an essentially aqueous solution, it is additionally unnecessary to carry out subsequent hydration. The contact lenses obtained by this process are therefore notable, according to an advantageous embodiment, for the fact that they are suitable for their intended usage without extraction. By intended usage is understood, in this context, that the contact lenses can be used in the human eye.

Methods of forming mold sections for cast-molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a contact lens mold.

In general, a mold comprises at least two mold sections (or portions) or mold halves, i.e. first and second mold halves. The first mold half defines a first optical surface and the second mold half defines a second optical surface. The first and second mold halves are configured to receive each other such that a contact lens forming cavity is formed between the first optical surface and the second optical surface. The first and second mold halves can be formed through various techniques, such as injection molding. These half sections can later be joined together such that a contact lens-forming cavity is formed therebetween. Thereafter, a contact lens can be formed within the contact lens-forming cavity using various processing techniques, such as ultraviolet curing.

Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, and PMMA can be used. Other materials that allow UV light transmission could be used, such as quartz glass.

Thermal curing or photo curing methods can be used to curing a polymerizable composition in a mold to form an ophthalmic lens. Such curing methods are well-known to a person skilled in the art.

In another aspect, the present invention provides a method of preparing preconditioned pigment particles. The method of the invention comprises: grinding a pigment in a solution of a polyionic material to a particle size of 1.5 micrometers or smaller to obtain a dispersion, wherein the concentration of the polyionic material is sufficient to coat pigment particles, preferably from about 0.01% to 10% (wt/vol); filtering the solution with pigment particles; optionally washing the filtered pigment particles; and optionally drying the filtered pigment particles coated with the one or more polyionic materials.

Any standard grinding techniques can be used in the present invention. Preferred grinding techniques include: high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other techniques known to those skilled in the art (see Ross S and Morrison ID, *Colloidal Systems and Interfaces*. New York: John Wiley & Sons, 1988.)

In a further aspect, the invention provides a visibility tinted ophthalmic lens comprising a polymeric matrix and preconditioned particles of a pigment distributed therein, wherein the polymeric matrix is a polymerization product of a polymerizable dispersion including a polymerizable material and the preconditioned particles of the pigment. A preferred ophthalmic lens is a visibility tinted contact lens formed from a polymerizable dispersion having preconditioned particles of copper phthalocyanine and at least one polymerizable prepolymer or macromer.

A full-body tinted contact lens of the invention can be a hard or soft contact lens. It can be a daily-disposable contact lens, a daily-wear contact lens or an extended-wear contact lens.

Above described polymerizable fluid composition and preconditioning of particles of a pigment can be used in preparation of the pigment-containing polymerizable dispersion. Any polymerizable materials, components and methods described above can be used in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Copper phthalocyanine (CuP) pigment from SUN chemical is added into a 0.1% poly(acrylic acid) (PAA, from polySciences, 75k MW) aqueous solution. For convenience the pH is adjusted to pH 5.0 with NaOH. CuP particles are dispersed into the solution by stirring for about 10 minutes with a magneticly-coupled stirrer and bar magnet. It is believed that CuP particles are coated with PAA during dispersing (or washing) process. In a control experiment, the 0.1% PAA is replaced by water. Even after stirring for over twelve hours, CuP particles are still not dispersed in water. The CuP particles dispersion in PAA solution are filtered to obtain PAA coated CuP particles which is then re-dispersed in a nefilcon (crosslinkable polyvinyl alcohol prepolymer) formulation (30% nelfilcon prepolymer in water) for making contact lenses. It has been dispersed for over five months without any significant agglomeration.

EXAMPLE 2

CuP pigment from SUN chemical is added into a 0.1% polyallylamine (PAH) (polySciences, ~75k MW) aqueous solution. For convenience the pH is adjusted to pH 5.0 with HCl. CuP particles are dispersed into the solution by stirring for about 10 minutes with a magneticly-coupled stirrer and bar magnet. It is believed that CuP particles are coated with PAH during dispersing (or washing) process. In a control experiment, the 0.1% PAH is replaced by water. Even after stirring for over twelve hours, CuP particles are still not dispersed in water. The CuP particles dispersion in PAH solution is filtered to obtain PAH coated CuP particles which is then re-dispersed in a nefilcon formulation for making contact lens. It has been dispersed for over five months without any significant agglomeration.

EXAMPLE 3

CuP is milled in the presence of a 0.03%, 0.1%, or 1% (wt/vol) PAA (polysciences, 75k MW) aqueous solution. The particle size achieved after twenty passes of a microfluidizer is 100% less than one micron. The same results are obtained using a ball mill over twenty passes.

EXAMPLE 4

PAA or PAH coated CuP particles, obtained in Example 1, 2, or 3 are decanted and allowed to dry in ambient conditions for a week. The dried coated CuP particles are then re-dispersed into water. The dried coated CuP particles can be dispersed in water within one minute.

EXAMPLE 5

Preparation of a CuP Dispersion by Grinding with a Horizontal Bead Mill

A Dyne Mill, which is a continuous horizontal working mill, is used to prepare a CuP dispersion. CuP pigment (from SUN Chemical) is pulverized and distributed in 1% Polyacrylic Acid Solution (pH 5.0) in the Dyne Mill by agitation and shearing through $ZrO_2$-beads. The energy necessary for this process is delivered by the agitator discs.

Equipment:
Mill: Dyne Mill model Multilab
Grinding container: 0.6 l ceramic container
Agitation: 4 ceramic agitator discs on a steel driving shaft (belt driven with 14 m/s or 4180 rpm); the shaft was sealed by water, container as well as shaft are cooled by water
Dynamic gap separator: 0.1 mm width.
Grinding Beads: yttrium stabilized $ZrO_2$ (95%) beads with 0.3 mm diameter (Muehlmeier GmbH & Co. KG, Germany)
Mill feeding: peristaltic pump (Willy A. Bach fen AG, Switzerland, model LP-A Nr. 010928), equipped with a silicon hose; feeding speed is approx. 75 ml/min (calibrated with water, position 0.45)

Preparation:
PAA-CuP dispersion: 1000 g 1% Polyacrylic Acid Solution (pH 5.0; 1% w/w solid content) is placed in a plastic container containing 50 g (5.0% w/w) of CuP pigment (from SUN Chemical). This mixture is stirred with a metallic wing stirrer (300 rpm) at room temperature—at least for one hour—until the pigment is dispersed completely. The blue dispersion is filled in a 1 l-beaker and the grinding started.

Grinding process: The CuP dispersion is fed from the glass beaker by the peristaltic pump through the Dyne-Mill. During the grinding the chamber pressure is kept below 1.0 bar and a container temperature below 70° C. The pressure as well as temperature control is performed by the product feeding—by switching the pump on/off. On the mill outlet the product is collected in a ice/water bath chilled 1l-beaker. After the dispersion has passed the mill completely, the empty beaker is replaced by the filled one and the grinding started again for the next passage. Each dispersion is grinded overall in 22 passages, in approximately 2.5 h.

Particle Size Distribution:
The particle size distribution of the dispersions is measured with a HORIBA-910 particle size measurement instrument. The measurement is performed generally one day after grinding. For the calculation a relative refractive index of RI=1.40-0.20i is used. The results in Table 1 show particle size distribution of CuP pigment dispersion after 22 passages grinding with the Dyno Mill.

stirring for 3 hours with a high speed stirrer (UltraTurek) at 10000 rpm to ensure homogeneity. At this time, the average particle size is 1–4 microns.

The dispersion prepared above is further dispersed using a Microfluidics 7125 Machine with an 87 micron chamber or a 100 micron chamber. The dispersion is circulated with a 200 micron pre-filter for fours hours at 25000 psi pressure. The dispersion is then measured with an Horiba 910 particle size analyzer, with ultrasonics turned off. 80% of particles has a size of less than 0.45 micron and 100% of particles has a size of less than 1.5 microns. After centrifugation at 4000 rpm for 5 minutes, 100% of particles has a size of 1 micron or less and the content of particles with a size of less than or equal to 0.45 micron is greater than 90%.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for producing full-body tinted contact lenses, the method comprising the steps of:
    (a) preconditioning particles of a pigments, wherein the step of preconditioning comprises
        applying a coating of one or more polyionic materials onto the surfaces of pigments particles by contacting the pigment particles with a solution of the one or more polyionic materials,
        removing the solution with pigment particles by filtration;
        optionally washing the filtered pigment particles with the coating of the one or more polyionic materials thereon, and
        optionally drying the filtered pigment particles with the coating of the one or more polyionic materials thereon;

TABLE 1

| | | Horiba-910 particle size distribution (RI-index 1.40–0.20i) | | | | | |
|---|---|---|---|---|---|---|---|
| Preparation # | Poloxamer [%] | Median [μm] | Median [μm] | SD [μm] | [%] ≦ 0.445 μm (spec.: 80%) | [%] ≦ 1.005 μm | Max. particle size [μm] (spec.: 2.0 μm) |
| 1 | 0.3 | 0.164 | 0.233 | 0.164 | 86.9 | 99.8 | 1.151 |
| 2 | 0.3 | 0.308 | .344 | 0.149 | 79.3 | 99.8 | 1.151 |
| 3 | 0.3 | 0.288 | 0.323 | 0.139 | 84.0 | 99.9 | 1.151 |
| 4 | — | 0.284 | 0.327 | 0.152 | 82.3 | 99.8 | 1.151 |
| 5 | — | 0.160 | 0.181 | 0.079 | 98.1 | 100.0 | 0.669 |
| 6 | — | 0.283 | 0.319 | 0.140 | 84.5 | 99.9 | 1.151 |
| Control* | — | 0.272 | 0.302 | 0.127 | 88.11 | 99.9 | 1.151 |

*Decanted dispersion after Mikrofluidizer grinding and centrifuging

EXAMPLE 6

5% by weight of CuP pigment from SUN chemical is added into a 1% PAA (from polySciences, 75k MW) aqueous solution. The pH of PAA solution is adjusted to pH 5.0 with NaOH. CuP particles are dispersed into the solution by (b) dispersing the preconditioned pigment particles in a polymerizable fluid composition to obtain a pigment-containing polymerizable dispersion;
    (c) introducing an amount of the pigment-containing polymerizable dispersion in a mold for making a contact lens; and (d) polymerizing the polymerizable dispersion in the mold to form a full-body tinted contact lens with the particles of the pigment entrapped and distributed therein.

2. The method of claim 1, wherein the preconditioning comprises washing the filtered pigment particles with the coating of the one or more polyionic materials thereon.

3. The method of claim 2, wherein the step of preconditioning comprises drying the filtered pigment particles with the coating of the one or more polyionic materials thereon.

4. The method of claim 1, wherein the polymerizable fluid composition is a solution or a solvent-free liquid or melt at a temperature below 60° C. of a polymerizable material in the presence or absence of other components which includes at least one member selected from the group consisting of a photoinitiator, a thermal initiator, an UV-blocking agent, a photosensitizer, an antimicrobial agent, and mixtures thereof.

5. The method of claim 4, wherein the polymerizable material comprises a prepolymer with ethylenically unsaturated groups and/or a silicone-containing macromer or vinylic monomer.

6. The method of claim 5, wherein the polymerizable material comprises one or more prepolymers with ethylenically unsaturated groups and optionally one or more vinylic monomers.

7. The method of claim 6, wherein the prepolymers are: water-soluble crosslinkable poly(vinyl alcohol) prepolymers; water-soluble vinyl group-terminated polyurethanes which are obtained by reacting an isocyanate-capped polyurethane with an ethylenically unsaturated amine (primary or secondary amine) or an ethylenically unsaturated monohydroxy compound, wherein the isocyanate-capped polyurethane can be a copolymerization product of at least one polyalkylene glycol, a compound containing at least 2 hydroxyl groups, and at least one compound with two or more isocyanate groups; crosslinkable derivatives of a polyvinyl alcohol, polyethyleneimine or polyvinylamine; water-soluble crosslinkable polyurea prepolymers; crosslinkable polyacrylamides; crosslinkable statistical copolymers of vinyl lactam, MMA and a comonomer; crosslinkable copolymers of vinyl lactam, vinyl acetate and vinyl alcohol; polyether-polyester copolymers with crosslinkable side chains; branched polyalkylene glycol-urethane prepolymers; polyalkylene glycol-tetra(meth)acrylate prepolymers; crosslinkable polyallylamine gluconolactone prepolymers; or mixtures thereof.

8. The method of claim 6, wherein the polymerizable material comprises at least one siloxane-containing vinylic monomer or macromer.

9. A full-body tinted contact lens obtained according to the method of claim 1.

10. The method of claim 1, wherein the pigment particles are coated with a polyanionic material.

11. The method of claim 10, wherein the polyanionic material is polymethacrylic acid, polyacrylic acid, or combination thereof.

12. The method of claim 10, wherein the preconditioned pigment particles are present in the polymerizable fluid composition in an amount from about 0.0001% to about 0.02% by weight.

13. A method for preparing preconditioned pigment particles, the method comprising the steps of:
(a) grinding a pigment in a solution of a polyionic material to a particle size of 1.5 micrometers or smaller to obtain a dispersion, wherein the concentration of the polyionic material is sufficient to apply a coating of the polyionic material onto each of pigment particles;
(b) removing the solution from the pigment particles having the coat of the polyionic material by filtration;
(c) optionally washing the filtered pigment particles; and
(d) optionally drying the filtered pigment particles coated with the polyionic material,
wherein the resultant preconditioned pigment particles is characterized by that, after being filtered and then dried under ambient conditions for a week, the dried, preconditioned pigment particles can be easily re-dispersed in water comparing to non-preconditioned pigment particles.

14. The method of claim 13, wherein the polyionic material is selected from the group consisting of a polycationic material, a polyanionic material and mixtures thereof.

15. The method of claim 14, wherein the polycationic material is selected from the group consisting of poly(allylamine hydrochloride), poly(ethyleneimine), poly(vinylbenzyltriamethylamine), polyaniline, sulphonated polyaniline, polypyrrole, poly(pyridinium acetylene), and mixtures thereof, wherein the polyanionic material is selected from the group consisting of polymethacrylic acid, polyacrylic acid, poly(thiophene-3-acetic acid), poly(4-styrenesulfonic acid), sodium poly(styrene sulfonate), poly(sodium styrene sulfonate), and mixtures thereof.

16. The method of claim 14, wherein the concentration of the polyionic material is from about 0.01% to about 10% (wt/vol).

17. The method of claim 14, wherein the particle size is smaller than 1 micrometer.

18. The method of claim 14, wherein the grinding step is carried out by using one or more grinding techniques selected from group consisting of high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, and Banbury mixers.

19. The method of claim 13, wherein the polyionic material is a polyanionic material.

20. The method of claim 19, wherein the polyanionic material is polymethacrylic acid, polyacrylic acid, or combination thereof.

* * * * *